MAGNETIC SWITCHING AND STORING DEVICE

Filed Dec. 1, 1954

INVENTOR.
Richard L. Whitely
BY
Morris A. Rabkin
ATTORNEY.

3,026,420

MAGNETIC SWITCHING AND STORING DEVICE

Richard L. Whitely, Haddonfield, N.J., assignor to Radio Corporation of America, a corporation of Delaware Filed Dec. 1, 1954, Ser. No. 472,367
20 Claims. (Cl. 307—88)

This invention relates to information handling systems, and particularly to magnetic devices for performing logical and switching functions in such systems.

Magnetic devices have been developed that employ magnetic cores made of material having a substantially rectangular hysteresis characteristic. These magnetic devices have the advantages of small size, small power-supply, and long life compared to certain vacuum tube devices. Such magnetic devices have been used in digital computers to perform various storage, logical, and switching functions including the functions of a storage register, a flip-flop, and an "and" circuit. A magnetic device that may be used for performing such functions is described in my copending patent application Serial No. 459,662, filed October 1, 1954, now Patent No. 2,816,278, issued December 10, 1957, entitled "Magnetic Switching Device.

Accordingly, it is among the objects of this invention to provide:

A new and improved magnetic device for performing logical, storage, and switching functions;

An improved and simple magnetic device for performing logical, storage, and switching functions that is reliable in operation;

An improved device for performing logical, storage, and switching operations that uses magnetic elements as the basic circuit components and that is economical in construction.

In accordance with this invention, a magnetic device includes a saturable magnetic core and circuit means for driving the core alternately from an initial state of saturation to the opposite state and back to the initial state. This circuit means includes a winding linked to the core, and means for applying pulses of alternately opposite polarities to the winding. Means are employed for applying input pulses to the circuit means to inhibit those pulses that tend to drive the core from the initial state. A winding linked to a second saturable magnetic core is connected in series with the first core winding and with both pulse-applying means in the same series circuit. An output pulse is induced in an output winding linked to the second core only upon the occurrence of an input pulse. A stepping register is provided by connecting in cascade a plurality of these devices, with output pulses from each being applied as input pulses to the succeeding device.

The foregoing and other objects, the advantages and novel features of this invention, as well as the invention itself both as to its organization and mode of operation, may be best understood from the following description when read in connection with the accompanying drawing, in which like reference numerals refer to like parts, and in which.

Figure 1:
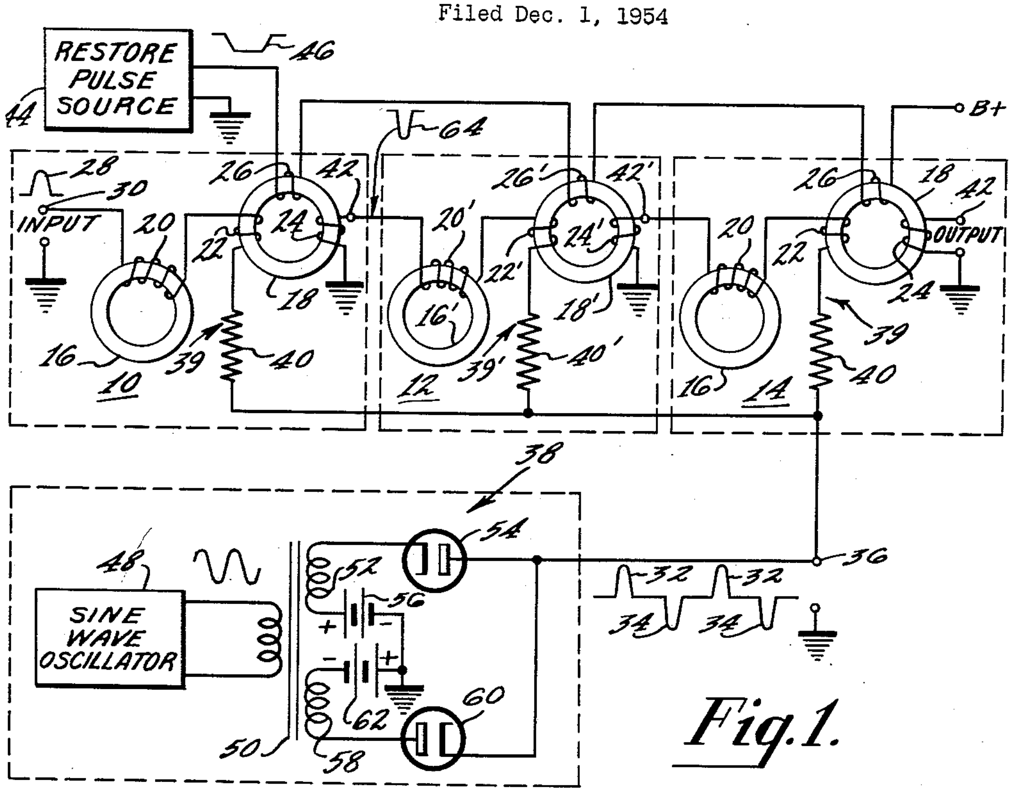
FIGURE 1 is a schematic circuit diagram of a magnetic device embodying this invention.

In FIGURE 1 a stepping register is shown formed of a plurality of stages 10, 12, 14 connected in cascade. The stages 10, 12, 14 are the same except where noted below. Therefore, only the first stage 10 is described in detail.

Figure 2:
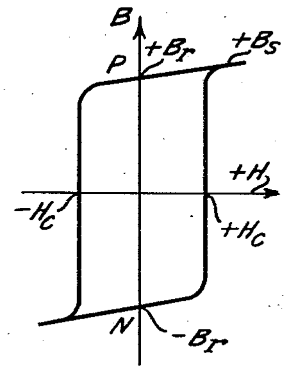
FIGURE 2 is an idealized graph of the hysteresis curve of magnetic cores that may be employed in the circuit of FIGURE 1.

A first and a second saturable magnetic core 16 and 18 are employed whose materials preferably have substantially rectangular hysteresis curves of the type shown in FIGURE 2. Desirable characteristics of the core material are a high saturation flux density $B_s$, a high value of residual flux density $B_r$ and a low coercive force $H_c$. Opposite magnetic states or directions of flux in the core are represented by P and N. For the present it is assumed that the cores 16, 18 have the same coercive force response; that is, a magnetizing force H at least equal to the threshold $H_c$ is required to drive a core from one remanent state to the other.

A single winding 20 is linked to the first core 16. An input winding 22, an output winding 24, and a restore winding 26 are linked to the second core 18. Pulses 28, that are positive-going with respect to a reference potential (shown as the conventional ground symbol), are received at an input terminal 30. Pulses 32, 34 that are alternately positive and negative are received at a power-supply terminal 36 from an alternating current (A.-C.) power supply 38. A series circuit 39 includes the input terminal 30, the first core winding 20, the second core input winding 22, a resistor 40, and the A.-C. terminal 36, connected in that order. One terminal of the second core output winding 24 is connected to ground, and the other terminal 42 of that winding 24 is the output terminal of the stage 10. Corresponding parts in the third stage 14 are referenced by same numerals, and in the second stage 12 by the same numerals with the addition of a prime (′).

Figure 3:
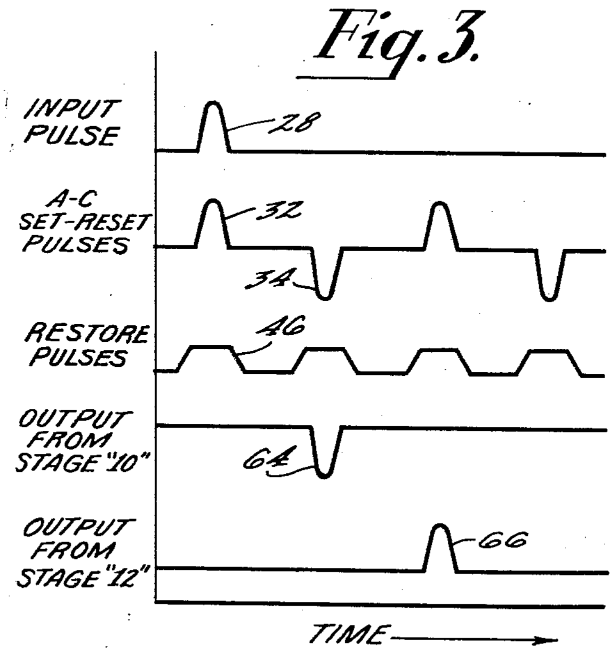
FIGURE 3 is an idealized graph of the time relationship of waveforms occurring at portions of the circuit of FIGURE 1.

The output terminal 42, 42′ of each stage 10 and 12 is connected as the input to the first core winding 20′, 20 of the succeeding stage 12 and 14, respectively. The output terminal 42 of the last stage 14 is the output of the stepping register. The input to the first stage 10 may be the output of another stage (not shown) or any other appropriate source that supplies positive-going input pulses 28 which are synchronized with the positive-going A.-C. pulses 32. The restore windings 26, 26′ of all the stages are connected in series between a restore-pulse source 44 and a source of operation potential B+. The restore-pulse source 44 may be any appropriate form of current generator which supplies current pulses 46 of uniform amplitude, which are timed to occur between the A.-C. pulses 32, 34 as shown in FIGURE 3.

The number of turns in each first core winding 20, 20′ is greater than the number of turns in the second core input and output 22, 22′ and 24, 24′. For example, if there are N turns in the input and output windings 22, 22′ and 24, 24′, 4N turns are appropriate for the first core windings 20, 20′. The senses of linkage of the windings 20 in the first 10, third 14, and any succeeding odd stages (not shown) are the same; and the respective linkage senses of corresponding windings 22 and 24 are likewise the same. Namely, the senses of linkage are such that the positive A.-C. pulses 32 applied to the first core windings 20 of the odd stages 10, 14 tend to turn the first cores 16 to state P. The same pulses 32 applied to the second core input windings 22 of the odd stages 10, 14 tend to turn the second cores 18 to state N; and the effect of the pulses 32, by way of the second core output windings 24 of the odd stages 10 and 14, is to tend to turn the second cores 18 to state N. If there are any succeeding even stages (not shown), the corresponding first core windings and the second core input and output windings would have the same senses of linkage as those in the second stage 12. The even stage windings 20′, 22′ and 24′ have linkage senses opposite to those of the corresponding windings 20, 22 and 24, respectively, in the odd stages 10, 14. Therefore, the effects of the A.-C. pulses 32 on the even stage cores 16′ and 18′ are the reverse of those discussed above on the odd stage cores 16 and 18, respectively.

An appropriate form of power supply 38 may include an oscillator 48 which applies a sine wave across the primary of a transformer 50. A first transformer secondary 52 is connected to the cathode of a diode 54, the anode of which is connected to the A.-C. terminal 36. The diode 54 is biased in its back direction by a D.-C. source 56. Another transformer secondary 58 is connected to the anode of the diode 60, the cathode of which is connected to the A.-C. terminal 36. This diode 60 is also biased in its back direction by a D.-C. source 62. The diodes 54, 60 alternately conduct during positive- and negative-going half-cycles of the sine wave. The reverse bias on the diodes 54, 60 prevents their conduction except during the high-amplitude portions of the sine wave. Thus, the lower-amplitude portions of the sine wave are clipped, and a train of spaced alternating pulses 32, 34 is generated at the terminal 36.

Initially, it may be assumed that all the cores are in state N. The operation of the first stage 10 alone is discussed first. In the absence of a pulse 28 the first positive A.-C. pulse 32 will drive the first core 16 of the first stage 10 to state P to "set" that core 16. The positive pulse 32 tends to drive the second core 18 further to saturation in state N and, thus, has only a negligible effect on that core 18. The next A.-C. pulse 34, a negative pulse, returns the first core 16 to state N to "reset" the core 16, which action is now described: The negative pulse 34 tends to drive the second core 18 to state P and the first core 16 to state N. The number of turns in the first core winding 20 is four times the number of turns in the second core input winding 22. Therefore, the current in the first core winding 20 necessary to produce a magnetizing force NI equal to the coercive force threshold $H_c$ is one-fourth the current in the second core winding 22 to produce the same force $H_c$. That is, the value of the coercive current for the core 16 is one-fourth the value of the coercive current for the core 18. Coercive current may be defined as the current required to generate the coercive magnetizing force of a given size core of a given magnetic material. The first core 16 starts to change from state P to state N while the second core 18 is still in a state of substantial saturation. During the time that the first core 16 is changing from P to N and is traveling along the vertical portion of the hysteresis curve, the current in the series circuit 39 is limited to one-fourth the current needed in the winding 22 to turn over the second core 18. The duration of the A.-C. pulse 34 is such that the first core 16 substantially absorbs the volt-time integral of the pulse 34 in changing from state P to N, and the second core 20 remains substantially unaffected in state N.

The same negative voltage pulse 34 is applied to the second core output winding 24 of the first stage 10 by way of the series circuit 39′ of the second stage 12. This pulse 34 also tends to drive the first stage second core 18 to P at the same time the pulse 34 tends to change the state of the second stage first core 16′ to the state P. The current in the second stage series circuit 39′ is limited in the same manner as in the first stage series circuit 39. The combined magnetizing force due to the currents in the second core windings 22 and 24 is 2NI which is half the magnetizing force 4NI applied to each of the first cores 16 and 16′. Thus, the first cores 16 and 16′ are driven to their respective opposite states, and the second core 18 of the first stage 10 remains substantially unchanged.

Because the senses of linkage of the windings 20′, 22′, and 24′ in the second stage 12 are the reverse of the corresponding ones in the first stage 10, a negative A.-C. pulse 34 sets the first core 16′ and the next positive pulse 32 resets that core. Thus, the second stage 12 operates a half-cycle of A.-C. behind the first stage 10. Similarly, the third stage 14 operates a half-cycle behind the second stage 12.

The restore current pulses 46 tend to drive the second cores 18 and 18′ to state N. With all the cores initially in state N and in the absence of any input pulses 28, the second cores 18 and 18′ remain in state N after each A.-C. pulse 32 and 34. Under these circumstances the restore pulse 46 that follows either A.-C. pulse 32 or 34 has substantially no effect on the second cores 18, 18′.

If a positive pulse 28 is received at the input terminal 30 of the first stage 10 at the same time that a positive A.-C. pulse 32 is received, and if the input pulse 28 has sufficient amplitude and duration to block the A.-C. pulse 32, the state of the first core 16 is not changed and it remains in N. The next negative A.-C. pulse 34 is presented with a negligible impedance by the first core winding 20 due to the core 16 being in state N. Therefore, substantially the full voltage of this negative pulse 34 is applied across the second core input winding 22 to reverse the state of that core 18 to state P. As the state of the second core 18 of the first stage 10 is reversed, a pulse 64 is applied as an input pulse to the second stage 12. This output pulse 64 is arranged to be of such amplitude, duration, and polarity that it cancels the effect in the series circuit 39′ of the same negative pulse 34 which produced the output pulse 64 in the first stage 10. Thus, the core 16′ is not set and remains in state N. The succeeding positive pulse 32 is a reset pulse for the second stage 12 and finds both the first core 16′ and the first stage second core 18 in state N. Therefore, this reset pulse 32 reverses the state of the second core 18′ to P inducing an output pulse 66 in the second core output winding 24′ of the second stage 12. Thus, it is seen from FIGURE 3 that an input pulse 28 applied to the first stage 10 results in an output pulse 64 from that stage 10 a half A.-C. cycle later, and an output pulse from the second stage 12 an additional half-cycle later. In a similar manner, the third stage 14 and any succeeding stages (not shown) also provide half-cycle delays to input pulses that are received. Thus, an input signal represented either by a pulse or the absence of a pulse is stepped along from stage to stage with a half-cycle delay in each stage.

After the negative A.-C. pulse 34 changes the state of the second core 18 of the first stage 10 to P, a restore pulse 46 is applied to the restore windings 26 to return the second cores 18 to state N. The current of the pulse 46 is made to change slowly so that the core turns over slowly, and the voltage induced in the second core windings 22, 24 is small and of long duration. The value of the resistor 40 is such as to limit the current flow in the 46 is made to change slowly so that the core 18 turns over the first cores 20, 20′. The second cores 18, 18′ are all held at state N by a current pulse 46 and, therefore, cannot be affected by voltages induced in the windings of other second cores. The same operation takes place during each restore pulse 46. The rise-time and duration of the restore pulses 46 generally are longer than those of the A.-C. pulses to permit the slow turnover of the second cores 18, 18′.

The cross-sectional area of the second cores 18, 18′ is preferably twice that of the first cores 16, 16′. As a result both cores 16, 16′ and 18, 18′ require the same voltages to produce a change of state, because the product of the cross-sectional area and the number of winding turns is the same in each case. Note, however, that the coercive currents required for changing the states of the cores 18, 18′ are larger than the coercive currents required for changing the states of the cores 16, 16′. The amplitude and duration of the output pulses 64, 66 are, therefore, substantially the same as the A.-C. pulses applied to the succeeding stages, and these A.-C. pulses are effectively blocked.

An alternative construction may include cores 16 and 18 with the same number of turns in the windings 20, 22 and 24, but with a relatively large diameter core being used for the second cores 18, 18', and a small diameter core for the first cores 16, 16'. As a result, a smaller magnetizing current is required to change the state of the smaller core.

It has been assumed for the purpose of the above description that the coercive forces $H_c$ of the cores 16 and 18 are the same, and the number of winding turns is different. Alternately, cores may be employed that have different coercive forces, the first core coercive force being less than that of the second core 18.

The shift register stages 10, 12, 14 may be combined with other units of the same type, in a manner known in the art, to perform various logical and switching operations. In my aforementioned Patent No. 2,816,278, a system for performing the "not" function is described.

It is seen from the above description of this invention that a new and improved magnetic device is provided that may be used for performing various storage, logical, and switching functions. The magnetic device is simple in construction and reliable in operation. Magnetic elements are the basic circuit elements, and vacuum tubes or crystal diodes are not required in the device except in the power supply.

What is claimed is:

1. A magnetic device comprising a plurality of magnetic elements made of a material having a substantially rectangular hysteresis curve, separate input and output windings linked to a first and a second one of said elements, and coupling means for applying signals to said second element input winding to change the magnetic state of said second element in accordance with changes of state of said first element, said coupling means including a third element, a winding linked to said third element, means for applying pulses of alternately opposite polarities to said third element winding tending to change said third element between two magnetic states, means for applying pulses induced in said first element output winding to said third element winding to oppose certain ones of said opposite polarity pulses, and means connecting said second element input winding to said third element winding for applying magnetic state changing signals to said second element input winding responsive to the opposing of certain ones of said opposite polarity pulses.

2. A magnetic device comprising a pair of magnetic elements each having two remanent states of substantial saturation, said elements changing from one remanent state to the other in response to magnetizing forces at least equal to predetermined thresholds, separate windings each linked to a different one of said elements, the coercive current required to change one of said elements between said states being greater than the coercive current corresponding to said threshold required to change the other of said elements between said states, and means for applying voltage pulses of alternately opposite polarities across said windings to tend to change one of said elements alternately between said states.

3. A magnetic device as claimed in claim 2 wherein said means for applying voltage pulses operates periodically.

4. A magnetic device comprising a pair of magnetic elements each having two remanent states of substantial saturation, said elements changing from one remanent state to the other upon the application of magnetizing forces at least equal to predetermined thresholds, separate windings each linked to a different one of said elements, the coercive current required to change one of said elements between said states being greater than the coercive current corresponding to said threshold required to change the other of said elements between said states, means for applying voltage pulses of alternately opposite polarities across said windings in series combination to tend to change one of said elements alternately between said states, the amplitudes and durations of said voltage pulses being such as to produce a current in said windings at least equal to the greater of said coercive currents, and input means for applying voltage pulses to said series combination to oppose certain of said opposite polarity pulses.

5. A magnetic device comprising a plurality of magnetic elements made of material having a substantially rectangular hysteresis curve, separate input and output windings linked to a first and a second one of said elements, means coupling said first element output windings to said second element input winding for transferring signals induced in said first element output winding to said second element input winding, said coupling means including a third one of said magnetic elements the coercive current of said third element being greater than the coercive current of either said first or said second elements, and a winding linked to said third element and connected in a series circuit with said first element output winding and said second element input winding, and means for applying pulses of alternately opposite polarities to said series circuit to tend to change said third element alternately between two magnetic states.

6. A magnetic device comprising a plurality of first and second magnetic elements, each having two substantially stable remanent states of substantial saturation and being characterized by changing from one of said states to the other in response to the application of magnetizing forces at least equal to a predetermined threshold, separate input and output windings linked to at least three of said first elements, and separate means coupling said output winding of each of said first elements to said input winding of a different one of said first elements for transferring signals induced in the associated output winding to the associated input winding, each of said coupling means including a different one of said second elements, the coercive current for said first elements being greater than the coercive current corresponding to said thresholds for said second elements, and a different single winding linked to the associated second element and connected in series with said output ad input windings associated therewith.

7. A magnetic device as claimed in claim 6 and further comprising means for applying voltage pulses of alternately opposite polarities to said coupling means.

8. In combination, a plurality of at least three magnetic devices each individually comprising a plurality of magnetic elements, each of said elements having two substantially stable remanent states of substantial saturation and being characterized by changing from one of said states to the other in response to the application of magnetizing forces at least equal to predetermined thresholds, each of said devices further comprising a single winding linked to a first one of said elements, and an input and an output winding linked to a second one of said elements, said single winding being connected in a series circuit with said input winding, the coercive current required to change said second element between said states being greater than the coercive current corresponding to said threshold required to change the first of said elements between said states, said magnetic devices having an operational order, and, in said combination, means connecting said second element output winding of each of said devices in said series circuit of a succeeding one of said devices in said order.

9. The combination as claimed in claim 8 and further comprising means for applying voltage pulses of alternately opposite polarities to said series circuit with said pulses applied to each of said series circuits having polarities with respect to the associated first element opposite to the polarities of pulses simultaneously applied to said series circuit of the succeeding magnetic device.

10. Apparatus comprising a plurality of magnetic devices, each of said magnetic devices including a separate first magnetic element made of a material having a substantially rectangular hysteresis characteristic, a winding linked to said magnetic element, means for applying pulses to said winding to drive said element alternately from an initial state and back to said initial state, and a separate second magnetic element made of a material having a substantially rectangular hysteresis characteristic, separate input, output and restore windings linked to said second element, said input winding being connected in series with said first element winding and said pulse applying means in the same series circuit, said apparatus further comprising means for applying input pulses to said winding of a first one of said devices to oppose those of said opposite polarity pulses tending to drive said element from said initial state, and means connecting said first device output winding in series with said first element winding and said output winding of a second one of said devices in the same series circuit, each of said first element windings having a greater number of turns than said input and output windings.

11. In combination, a plurality of magnetic devices each individually comprising a plurality of magnetic elements made of a material having a substantially rectangular hysteresis curve, each of said elements being characterized by changing from one of said states to the other in response to the application of magnetizing forces at least equal to predetermined thresholds, each of said devices further comprising a single winding linked to a first one of said elements, and an input and an output winding linked to a second one of said elements, said single winding being connected in a series circuit with said input winding, the coercive current required to change said second element between said states being greater than the coercive current corresponding to said threshold required to change said first element between said states, said magnetic devices having an operational order, and, in said combination, means connecting said second element output winding of each of said devices in said series circuit of a succeeding one of said devices in said order.

12. In combination, a first magnetic core having a first winding thereon; a source of pulses; a second magnetic core having a second winding thereon and means for resetting said second core, said second winding being serially connected between said source and said first winding, said source including switching means and means for actuating said switching means, and said first core being adapted to switch in a shorter time than the time required to switch said second core.

13. In the combination as set forth in claim 12, the geometry of said second core being such that the switching time of said second core is longer than the switching time of said first core.

14. In the combination as set forth in claim 12, said first winding containing more turns than said second winding.

15. In the combination as set forth in claim 12, the core materials in said first and second cores being such that a smaller induced flux is required to switch said first core than is required to switch said second core.

16. In combination, a first magnetic core having two remanent states; a second magnetic core having two remanent states and requiring a longer interval of time than said first core to switch from one remanent state to the other in response to a given switching current; a winding on said first core; a winding on said second core, means for applying pulses to said windings connected in series therewith; and means for resetting said second core coupled to said second core.

17. In the combination as set forth in claim 16, said winding on said second core having fewer turns than said winding on said first core, said second core requiring a longer interval of time to switch from one remanent state to the other than said first core by virtue of said fewer number of turns in said winding on said second core.

18. A magnetic shift register comprising: a first and a second series of cores composed of a magnetic material having a substantially rectangular hysteresis loop, a first winding and a second winding coupled to each core of said first series, a sole winding coupled to each core of said second series, each sole winding being connected in series with the second winding of a preceding core of said first series and in series with the first winding of a succeeding core of said first series, and means for applying pulses of opposite polarity to the series combinations of sole and first windings and sole and second windings.

19. A magnetic shift register comprising: first and second groups of cores composed of a magnetic material having a substantially rectangular hysteresis loop, a first winding and a second winding coupled to each core of said first group, a sole winding coupled to each core of said second group, each sole winding being connected in series with the second winding of a preceding core of said first group and the first winding of a succeeding core of said first group, and means for applying a train of pulses succeeding ones of which are of opposite polarity to said series connected windings.

20. A magnetic shift register comprising: a first and a second series of cores composed of a magnetic material having a substantially rectangular hysteresis loop, a first winding and a second winding coupled to each core of said first series, a sole winding coupled to each core of said second series, each sole winding being connected in series with the second winding of a preceding core of said first series and in series with the first winding of a succeeding core of said first series, an alternating current generator; oppositely poled rectifiers connected to said alternating current generator for producing pulses, succeeding ones of which are of opposite polarity; and means for applying said pulses across said first, second and sole windings.

References Cited in the file of this patent

UNITED STATES PATENTS

| | | |
|---|---|---|
| 2,375,609 | Zuhlke | May 8, 1945 |
| 2,685,644 | Toulon | Aug. 3, 1954 |
| 2,709,798 | Steagall | May 31, 1955 |
| 2,730,694 | Williamson | Jan. 10, 1956 |
| 2,731,203 | Miles | Jan. 17, 1956 |
| 2,763,851 | Haynes | Sept. 18, 1956 |
| 2,781,503 | Saunders | Feb. 12, 1957 |
| 2,784,390 | Chien | Mar. 5, 1957 |

OTHER REFERENCES

Proc. of Assoc. for Computing Mach., May 1952, pp. 223–229.

Electronics, October 1954, pp. 170–173.